US012607594B2

(12) United States Patent
Meier

(10) Patent No.: US 12,607,594 B2
(45) Date of Patent: Apr. 21, 2026

(54) ISFET BIOSENSOR

(71) Applicant: Texas Instruments Incorporated, Dallas, TX (US)

(72) Inventor: Sebastian Meier, Munich (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 871 days.

(21) Appl. No.: 17/461,975

(22) Filed: Aug. 30, 2021

(65) Prior Publication Data
US 2022/0065811 A1 Mar. 3, 2022

Related U.S. Application Data

(60) Provisional application No. 63/074,262, filed on Sep. 3, 2020.

(51) Int. Cl.
*G01N 27/414* (2006.01)
*G01N 1/38* (2006.01)
*G01N 27/02* (2006.01)

(52) U.S. Cl.
CPC ........... *G01N 27/4145* (2013.01); *G01N 1/38* (2013.01); *G01N 27/026* (2013.01); *G01N 2001/381* (2013.01)

(58) Field of Classification Search
CPC .... G01N 27/4145; G01N 1/38; G01N 27/026; G01N 2001/381; G01N 33/558; G01N 21/78; G01N 27/4167; G01N 21/80; G01N 33/5438; G01N 33/84; G01N 2021/752; B01L 3/50273; B01L 2400/0415–0427; B01L 3/5023; C12Q 1/686; C12Q 1/703; C12Q 2600/158
See application file for complete search history.

(56) References Cited

U.S. PATENT DOCUMENTS

| | | | |
|---|---|---|---|
| 6,358,752 B1 * | 3/2002 | Durst | G01N 33/54388 435/7.1 |
| 6,478,938 B1 * | 11/2002 | Paek | C12Q 1/002 204/403.01 |
| 9,960,135 B2 | 5/2018 | Rinck et al. | |
| 10,297,497 B2 | 5/2019 | Meier et al. | |
| 10,504,733 B2 | 12/2019 | Meier et al. | |
| 10,707,089 B2 | 7/2020 | Meier et al. | |
| 11,011,381 B2 | 5/2021 | Meier et al. | |

(Continued)

OTHER PUBLICATIONS

Michael A. Mansfield, Design Considerations for Lateral Flow Test Strips, 2015, EMD Millipore, pp. 1-32 (Year: 2015).*

(Continued)

*Primary Examiner* — James Lin
*Assistant Examiner* — Sommer Yousef Osman
(74) *Attorney, Agent, or Firm* — Zhenhai Fu; Frank D. Cimino

(57) ABSTRACT

In described examples, a biosensor device has a porous membrane with a test region that contains a test analyte. A sensor die has an ion sensing field effect transistor (ISFET) with an ion sensitive gate element located in an active sensor surface of the sensor die. The active sensor surface is in contact with the porous membrane test region. A controller is coupled to the ISFET and an interface module is coupled to the controller to provide a human readable test result.

14 Claims, 12 Drawing Sheets

(56) References Cited

U.S. PATENT DOCUMENTS

| | | | | |
|---|---|---|---|---|
| 2013/0217598 | A1* | 8/2013 | Ludwig | G01N 33/54373 |
| | | | | 422/68.1 |
| 2016/0153878 | A1* | 6/2016 | Candon | G01N 1/38 |
| | | | | 422/520 |
| 2016/0231251 | A1* | 8/2016 | Ou | G01N 27/4167 |
| 2017/0059563 | A1* | 3/2017 | Smith | G01N 21/6454 |
| 2017/0067889 | A1* | 3/2017 | Tamir | G01N 33/54388 |
| 2020/0178894 | A1* | 6/2020 | Streiff | G01N 33/54366 |
| 2021/0020528 | A1 | 1/2021 | Meier et al. | |
| 2021/0285910 | A1* | 9/2021 | Hatamian | B01L 3/5023 |
| 2023/0221312 | A1* | 7/2023 | Hellmich-Duong | |
| | | | | G01N 33/549 |
| | | | | 435/7.9 |
| 2023/0333118 | A1* | 10/2023 | Laufer | G01N 33/5438 |

OTHER PUBLICATIONS

"PH Sensor", TI-91808, U.S. Appl. No. 17/105,142, filed Nov. 25, 2020, pp. 1-39.

P. Bergveld et al, "How Electrical and Chemical Requirements for REFETs May Coincide", Sensors and Actuators, vol. 18, Issue 3-4, Jul. 1989, pp. 309-327.

Sujatha Ramachandran et al, "A Rapid, Multiplexed, High-Throughput Flow-Through Membrane Immunossay: A Convenient Alternative to ELISA", Diagnostics ISSN 2075-4418, vol. 3, Issue 2, Apr. 2013, pp. 244-260.

"ELISA", Wikipedia, available at https://en.wikipedia.org/w/index.php?title=Elisa&oldid=102375116 on May 17, 2021, pp. 1-10.

A. Errachid, J. Baussells, and N. Jaffrezic-Renault, "A simple REFET for pH detection in differential mode", Sensors and Actuators B:Chemical, vol. 60, Issue 1, Nov. 2, 1999, pp. 43-48.

"ISFET", Wikipedia, available at https://en.wikipedia.org/w/index.php?title=ISFET&oldid=1021704059 on May 6, 2021, pp. 1-7.

Bart H. van der Shoot and Piet Bergveld, "ISFET Based Enzyme Sensors", Biosensors, vol. 3, Issue 3, 1987-1988, pp. 161-186.

Sabine Koch, "Protein Detection with a Novel ISFET-Based Zeta Potential Analyzer", Biosensors & Bioelectronics, vol. 14, Issue 4, Apr. 30, 1999, pp. 413-421.

"Lateral flow test", Wikipedia, available at https://en.wikipedia.org/w/index.php?title=Lateral_flow_test&oldid=1033886478 on Jul. 16, 2021, pp. 1-7.

* cited by examiner

102
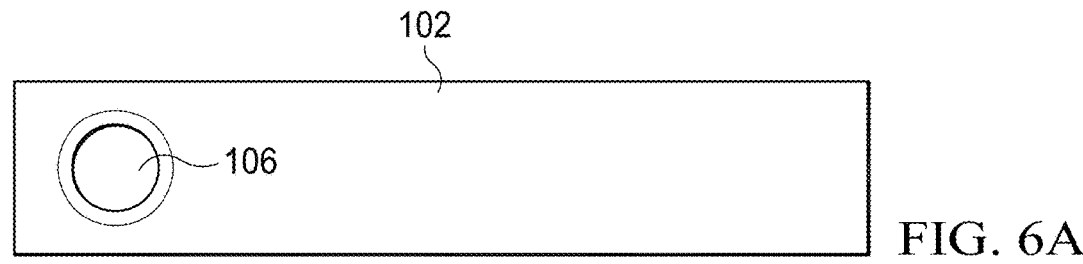
106
FIG. 6A
110    112    114    115    116    118
619
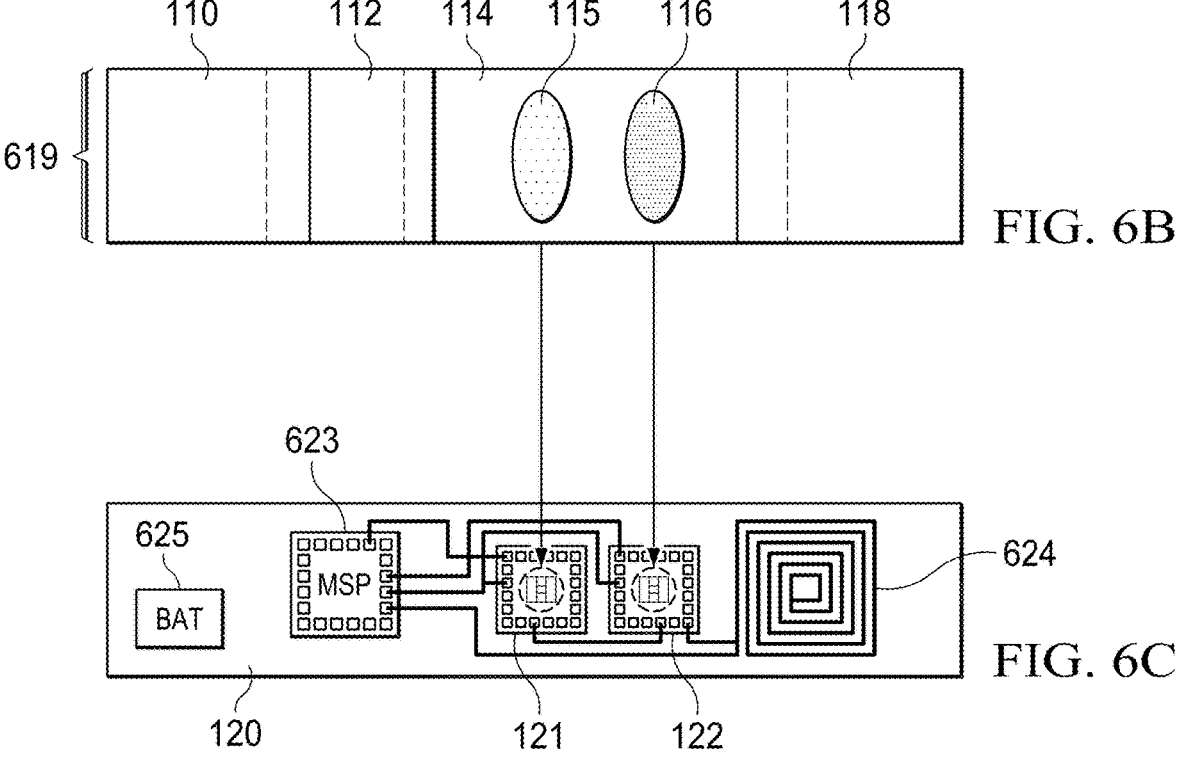
FIG. 6B
623
625
BAT
MSP
624
120    121    122
FIG. 6C
643    MSP    S1    S2
104    641    642
FIG. 6D

700

712    710

90μm

800

806

4.2mm

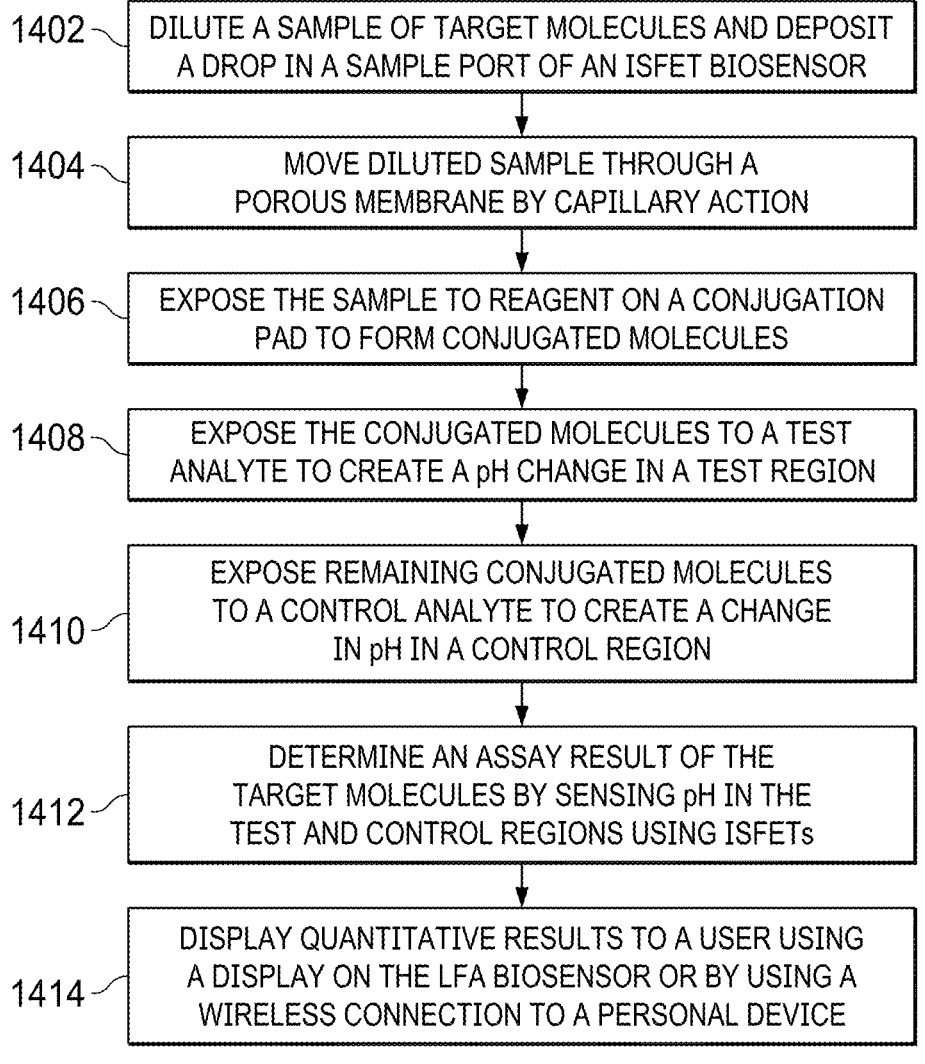

1402 — DILUTE A SAMPLE OF TARGET MOLECULES AND DEPOSIT A DROP IN A SAMPLE PORT OF AN ISFET BIOSENSOR

1404 — MOVE DILUTED SAMPLE THROUGH A POROUS MEMBRANE BY CAPILLARY ACTION

1406 — EXPOSE THE SAMPLE TO REAGENT ON A CONJUGATION PAD TO FORM CONJUGATED MOLECULES

1408 — EXPOSE THE CONJUGATED MOLECULES TO A TEST ANALYTE TO CREATE A pH CHANGE IN A TEST REGION

1410 — EXPOSE REMAINING CONJUGATED MOLECULES TO A CONTROL ANALYTE TO CREATE A CHANGE IN pH IN A CONTROL REGION

1412 — DETERMINE AN ASSAY RESULT OF THE TARGET MOLECULES BY SENSING pH IN THE TEST AND CONTROL REGIONS USING ISFETs

1414 — DISPLAY QUANTITATIVE RESULTS TO A USER USING A DISPLAY ON THE LFA BIOSENSOR OR BY USING A WIRELESS CONNECTION TO A PERSONAL DEVICE

FIG. 14

ISFET BIOSENSOR

CROSS-REFERENCE TO RELATED APPLICATION

This application claims priority to U.S. Provisional Patent Application No. 63/074,262, "ISFET Biosensor Flow Assay," filed Sep. 3, 2020, the entirety of which is incorporated herein by reference.

TECHNICAL FIELD

This relates to a lateral flow immunoassay biosensor device using ISFET sensors.

BACKGROUND

Lateral flow immunoassays (LFA) provide low cost, fast, portable, and simple to use devices, but are generally not considered a diagnostic tool, especially for applications like virus diagnostics, when target analytes such as virus protein or antigens of low concentrations are tested for. For example, low concentrations may be in the range of ug/ml-ng/ml. For this and other applications where patients would like to do a test from the safety of their home or "over the counter," LFAs are considered too unspecific and suffer from low sensitivity.

LFAs have several shortcomings because when a non-expert patient self-administers the test improper procedure may occur due to not properly wetting a sample; wrongly diluting a sample; etc. LFAs are qualitative because of subjective judgment variation in visual interpretation: "judged by the eye of the patient". LFAs suffer from reproducibility, and optical markers can interfere with the target analyte reaction.

For higher fidelity in the result, an expensive read out instrument at a point of care (PoC) location, such as a clinic, lab, etc. is required, and can provide semi-quantitative results.

SUMMARY

In described examples, a biosensor device has a porous membrane with a test region that contains a test analyte. A sensor die has an ion sensing field effect transistor (ISFET) with an ion-sensitive gate element located in an active sensor surface of the sensor die. The active sensor surface is in contact with the test region. A controller is coupled to the ISFET and an interface module is coupled to the controller to provide a human readable test result.

BRIEF DESCRIPTION OF THE DRAWINGS

FIGS. 6A-6D illustrate example basic components of an example ISFET biosensor.

FIG. 14 is a flow diagram of operation of an example ISFET biosensor.

DETAILED DESCRIPTION

Figure 1:
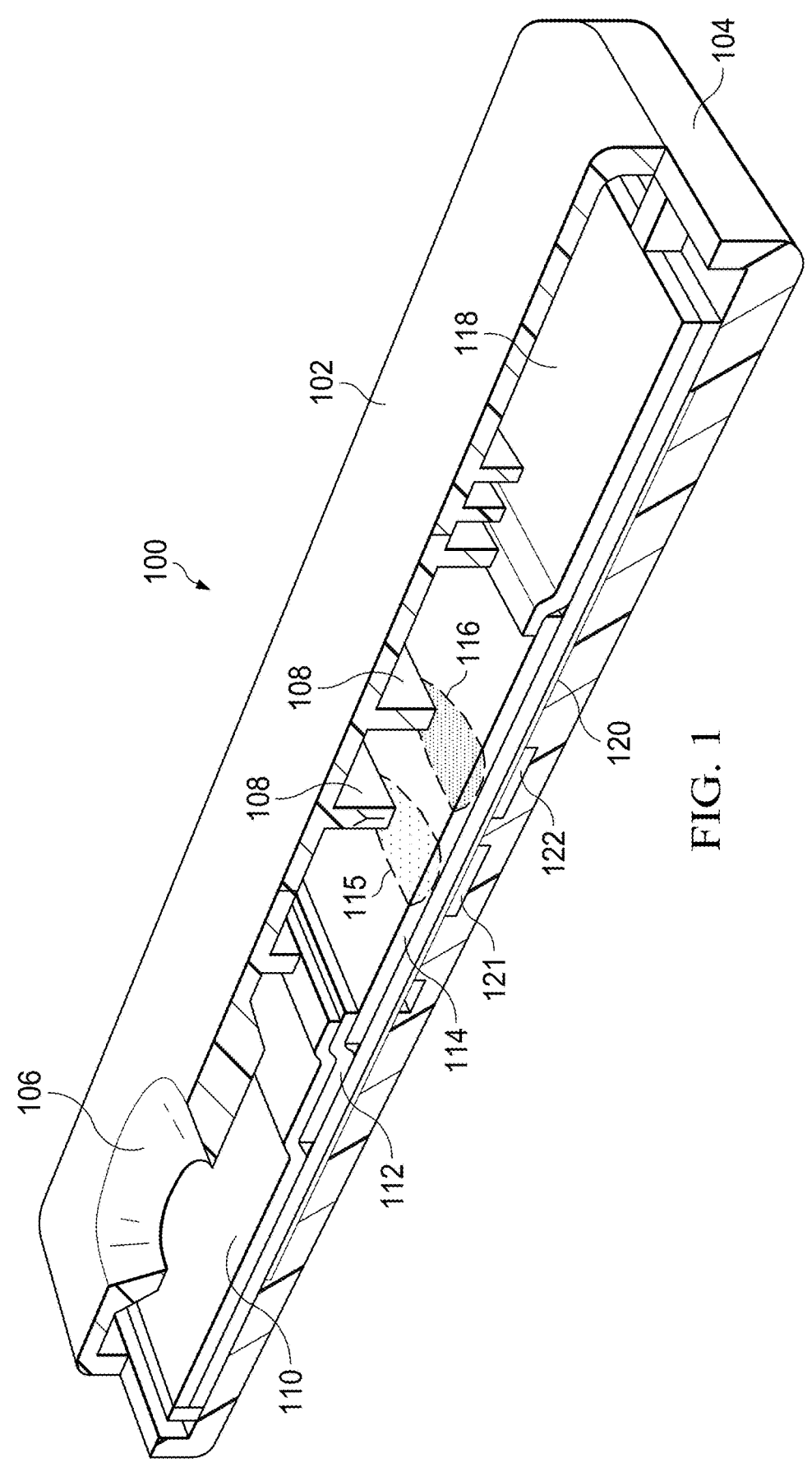
FIG. 1 is an isometric sectional view of an ISFET biosensor that uses ion sensitive field effect transistors.

In the drawings, like elements are denoted by like reference numerals for consistency.

LFA sensors, also known as lateral flow immunochromatographic rapid tests, are simple devices intended to detect the presence of a target substance in a liquid sample without the need for specialized and costly equipment. These tests are widely used in medical diagnostics for home testing, point of care testing, or laboratory use. For instance, the home pregnancy test is an LFA that detects a specific hormone. These tests are simple, economic, and generally show results in around five to 30 minutes.

However, subjective judgment variation in visual interpretation may exist among end-users, caused by the differences of illumination setting and personal visual ability and other psychological factors. Thus, it could lead to controversial readouts, especially when the colorimetric signal is close to the threshold. As an example, to meet the POC testing requirements for using PSA as a prostate cancer screening biomarker, there is an unmet need to overcome the shortcomings of colorimetric readouts of LFA strips and generate quantitative PSA results in concentration ranges, such as: <4 ng mL−1,4-10 ng mL−1, and >10 ng mL−1. Such accuracy is currently only achievable in the central clinical laboratory setting.

Much effort has been directed to the development of quantitative LFA sensors to offer accurate concentration-related information of a target molecule or cell of interest. This can be achieved using various techniques, such as using an optical or magnetic transducer in combination with a LFA sensor. However, optical and magnetic transducer techniques are limited in that an optical or magnetic response, respectively, is required to be generated by the LFA. Specialized transducer techniques may require expensive design changes to sense a different target molecule or cell of interest.

The general LFA technique will be described briefly herein. More detailed descriptions of LFA technology are widely available, for example, see "Lateral Flow Test," Wikipedia, July 2021 or later. LFAs operate on the same principles as the enzyme-linked immunosorbent assays (ELISA). In a simple form of an ELISA, antigens from the sample to be tested are attached to a surface. Then, a matching antibody is applied over the surface so it can bind the antigen. This antibody is linked to a label, such as an enzyme, and then any unbound antibodies are removed. In the final step, a substance containing the enzyme's substrate is added. If there was binding the subsequent reaction produces a detectable signal, most commonly a color change. Performing an ELISA involves at least one antibody with specificity for a particular antigen. More detailed descriptions of ELISA techniques are widely available, for example, see "ELISA," Wikipedia, May 2021 or later. The common ELISA test requires additional chemicals, washing steps, and skilled personnel to carry out the test, and it therefore is not typically used outside laboratories. A typical LFA device may use gold nanoparticle (AuNP) in place of an enzyme for the label function. When gathered at a specific site, the AuNP make part of the membrane appear colored. In ELISA, a color changes occurs with enzymatic activity, that is, the reaction taking place changes color.

In the example ISFET biosensors described herein, the entire immunoassay process, including washing and signal-reporting, can be integrated into one capillary paper-based strip starting with one drop of a sample. Capillary action serves as an autonomous microfluidic pumping system without the requirement of external pumps. In essence, these tests run the liquid sample along the surface of a membrane, also referred to as a "pad." The pads are based on a series of capillary beds, such as pieces of porous paper, microstructure polymer, or sintered polymer. Each of these pads has the capacity to transport fluid (e.g., urine, blood, saliva) spontaneously.

The sample pad acts as a sponge and holds an excess of sample fluid. Once soaked, the fluid flows to the conjugate pad that contains a prepositioned reagent. The conjugate pad contains all the reagents required for an optimized chemical reaction between the target molecule (e.g., an antigen) and its chemical partner (e.g., antibody) that has been immobilized on the particle's surface. This marks target particles as they pass through the pad and continue across to the test and control regions. The test region contains a pre-positioned reagent that causes a change in pH that can be sensed by an ISFET that is in contact with the test region of the membrane. The control region contains affinity ligands which also cause a change in pH that can be sensed by a second ISFET that is in contact with the control region of the membrane to show whether the sample has flowed through and the biomolecules in the conjugate pad are active. After passing these reaction zones, the fluid enters the final porous material, the wick, which acts as waste container and capillary pump.

In example ISFET biosensors described herein, the control region contains a further antibody (one which is not specific to the analyte) that binds some of the remaining particles which did not bind to the test region. This confirms that fluid has passed successfully from the sample-application pad, past the test region. By giving confirmation that the sample has had a chance to interact with the test region, this increases confidence that an unchanged test region can be interpreted as a negative result or that a changed test region can be interpreted as a negative result in a competitive assay.

The use of ion sensitive field effect transistors (ISFET) operating in a differential configuration along with integration of noble metal electrodes allows a lab-on-a-chip type measurement of multiple parameters, most importantly, pH. Using this configuration of ISFET, a proper test procedure can be implemented to survey a target analyte reaction within a control region vs. an analyte reaction within a test region. Control and test regions are comparable to those of typical LFAs, but the quantitative detection principle is done with electrochemical markers rather than markers having an optical or magnetic nature. In described examples, a biochemical reaction between a membrane-immobilized antibody with an antigen release or changes an electrochemical marker that causes a detectable shift of the local pH. The shift in pH is measured by an ISFET sensor that is in close proximity to the LFA membrane. In one example, a single integrated circuit (IC) with two or more ISFETs covers both test and control regions. In another example, or two or more ICs with ISFETs are located underneath their respective functionalized membrane regions along a fluid flow path within an ISFET biosensor.

In examples described herein, an ISFET is used as a fundamental sensing unit which can serve as a sensing unit to survey electrochemical methods, such as potentiometric, impedimetric, amperometric, etc. A platinum metallization process allows for small feature size inert metal electrodes, and overall small die size. Therefore, these ISFET sensor devices can be mass produced at a price that is compatible with disposable at-home-tests like LFAs. Sensors can be easily manufactured on industrial scale, as well as on laboratory scale with small batches.

FIG. 1 is an isometric sectional view of an example ISFET biosensor 100 that uses ion sensitive field effect transistors in sensors 121, 122 to detect pH variations that occur as a result of a chemical reaction that takes place in membrane 114 in response to a sample liquid that is instilled into sample port 106 of upper housing 102. In this example, lower housing 104 mates with upper housing 102 to enclose and protect the ISFET biosensor components.

In this example, sample pad 110 receives a sample liquid containing target molecules that is instilled into sample port 106 of upper housing 102. Sample pad 110 acts as a sponge and holds an excess of sample fluid. Once soaked, the fluid flows to conjugate pad 112 in which a manufacturer has stored freeze dried bio-active particles called conjugates in a salt-sugar matrix. The conjugate pad contains all the conjugate reagents required for an optimized chemical reaction between the target molecule (e.g., an antigen) and its chemical partner (e.g., antibody) that has been immobilized on the particle's surface.

The target particles then pass-through conjugate pad 112 and continue across porous membrane 114 to the test region 115 and control region 116. In this example, membrane 114 is approximately 180 um thick. The test region is pretreated with a reagent that produces a change in pH that is sensed by ISFET sensor 121. The control region contains affinity ligands to produce a further reaction that is sensed by ISFET sensor 122. The reaction at the control region 116 shows whether the sample has flowed through and the biomolecules in the conjugate pad are active. After passing these reaction regions, the fluid enters the final porous material, the absorbent pad 118, that simply acts as a waste container In this example, ISFET sensor 121, 122 are mounted on a flexible substrate 120 along with a control module and user interface unit (not shown). Posts 108 are formed as part of upper housing 102 and are designed to urge membrane 114 into contact with an active sensing surface of biosensors 121, 122.

Figure 2:
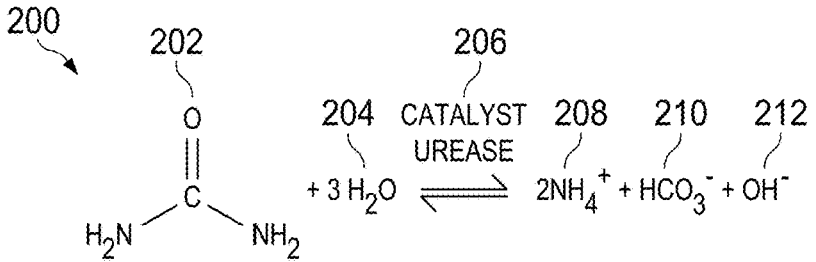
FIGS. 2-4 illustrate an example chemical reaction in an example biosensor device.

FIG. 2 illustrates an example chemical reaction that can be performed in test region 115 and control region 116 of test porous membrane 114 (FIG. 1). In this example, urea 202 that has been mixed with water 204 reacts to form ammonia in the presence of a catalyst urease 206. Carbonic acid 210 and hydroxide 212 are also formed. Ammonia 208 cause pH of the resulting solution to increase. This increase in pH can then be sensed by an ISFET.

Figure 3:
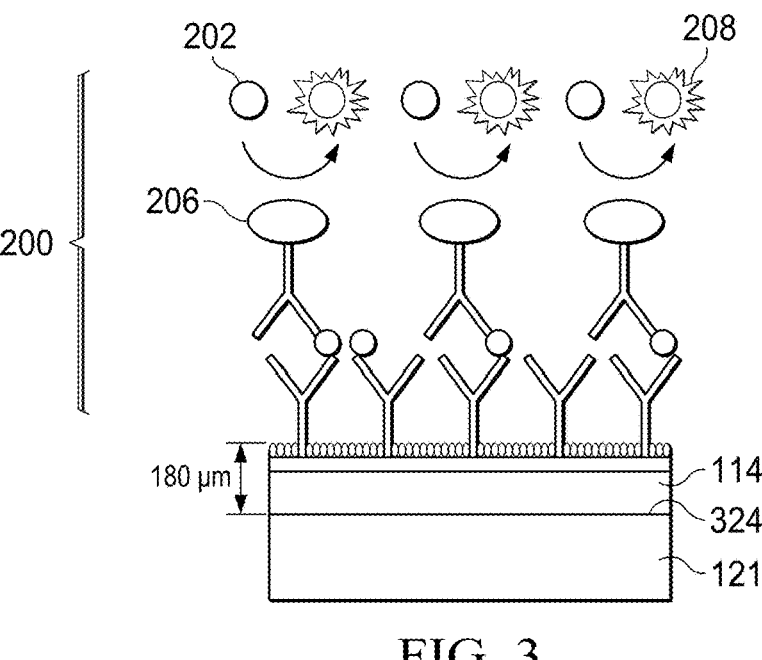

FIG. 3 illustrates a more detailed cross-section of a portion of ISFET biosensor 100 (FIG. 1) illustrating ISFET biosensor 121 and a portion of membrane 114. In this example, a catalyst urease 206 is immobilized within a region in membrane 114. In this example, membrane 114 is approximately 180 um and the urease 206 is disbursed throughout the thickness of membrane 114. An example chemical reaction 200 occurs in membrane 114 as illustrated in more detail in FIG. 2 in response to a solution of urea 202 being instilled into sample port 106 (FIG. 1) of ISFET biosensor 100. An active sensor surface 324 of biosensor 121 includes an ISFET sensing region that is in contact with membrane 114. In this manner, small changes in pH that occur in membrane 114 due to a chemical reaction 200 can be sensed by biosensor 121. This enables a very low limit of detection (LOD) for the target molecules.

Figure 4:
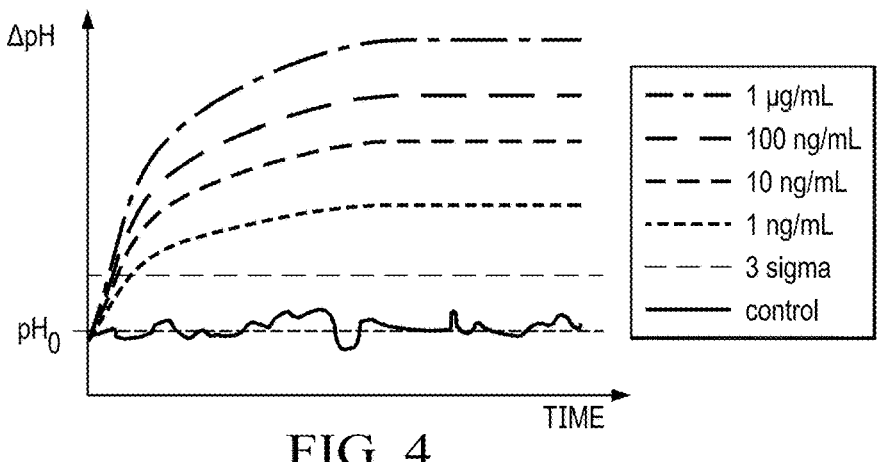

FIG. 4 illustrates plot lines of changes in pH over time for various solutions of examples of urea 202, ranging from 1 ng/ml to 1 ug/ml. pH is a log scale quantity; analyte concentration typically varies in a log-scale manner depending on infection stage and patient-to-patient and virus-to-virus.

FIGS. 5A-5E illustrate flow of another example liquid flow through example ISFET biosensor 500 that is similar to ISFET biosensor 100 of FIG. 1 using ELISA principles. Various types of assays can be performed using the same basic configuration of ISFET biosensor 500. For a selected target molecule (e.g., an antigen), conjugate pad 112 is configured to contain all the reagents required for an optimized chemical reaction between the target molecule and its chemical partner (e.g., antibody). Test region 115 and control region 116 are configured with appropriate affinity ligands to produce a reaction, such as a shift in pH, that can be sensed by ISFET sensors 121, 122. In this manner, different ISFET biosensors can be created to test for different target molecules by simply depositing different conjugate and affinity ligands in the porous membrane without needing to make any change in the ISFET sensors 121, 122 and supporting electronic circuits.

Figure 5A:
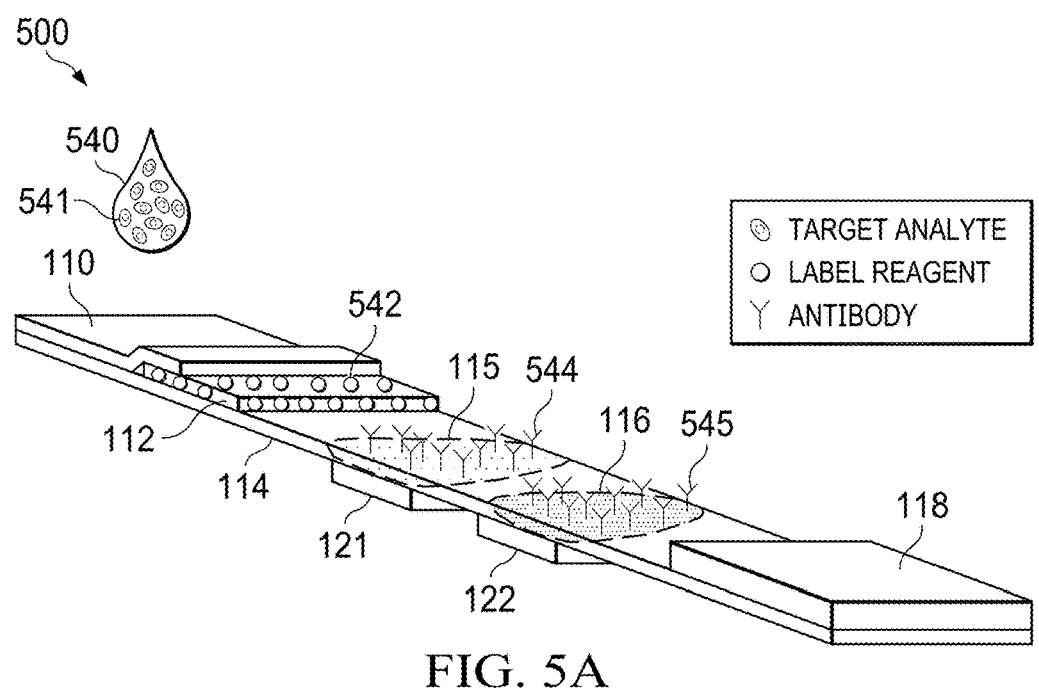
FIGS. 5A-5E illustrate flow of an example liquid through an example ISFET biosensor.

In FIG. 5A, in this example, a sample 540 is dropped into sample port 106 (FIG. 1) onto sample pad 110. Sample 540 includes target analyte particles 541 that are mixed with water or another suitable fluid that will percolate through porous sample pad 110, conjugate pad 112, and membrane 114 to absorbent pad 118.

Conjugation pad 112 includes enzymes or other kinds of electrochemical label that can be coupled to specific antibodies within the conjugate pad. Test region 115 includes test antibodies 544. Control region 116 includes control antibodies 545. An active sensor surface of bio sensors 121, 122 is in contact with membrane 114.

Figure 5B:
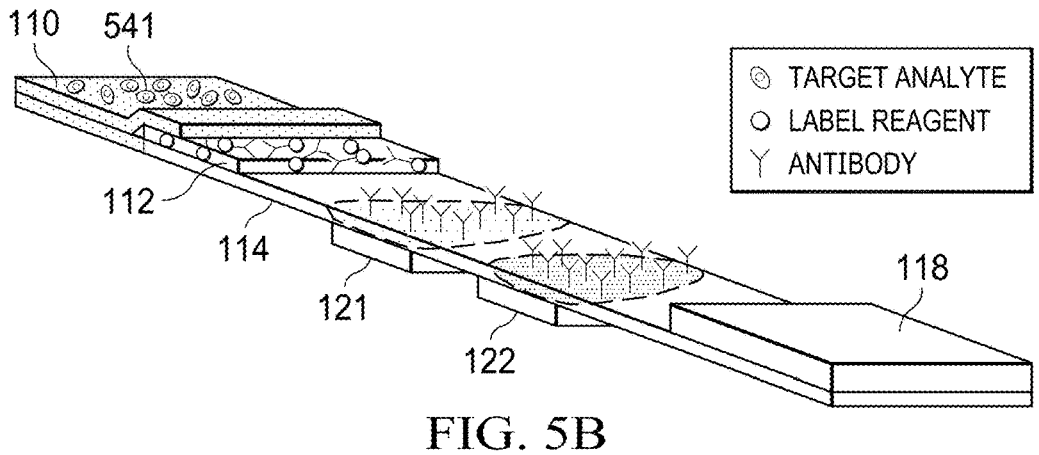

In FIG. 5B, capillary action causes liquid 540 with analyte particle 541 to migrate from sample pad 110 into conjugation pad 112.

Figure 5C:
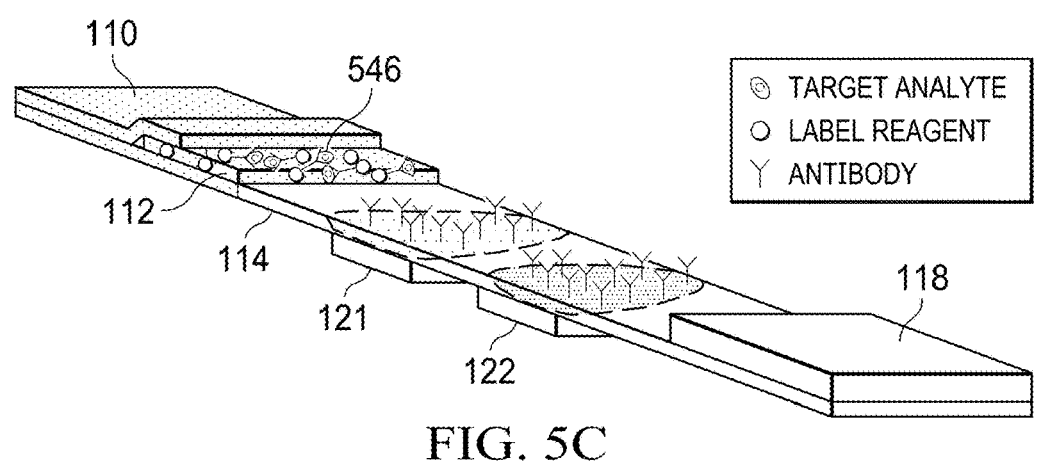

In FIG. 5C, target analyte particles 541 begin to react with immobilized antibodies 542 to bind to antibodies 542 to form conjugated labeled antibodies 546.

Figure 5D:
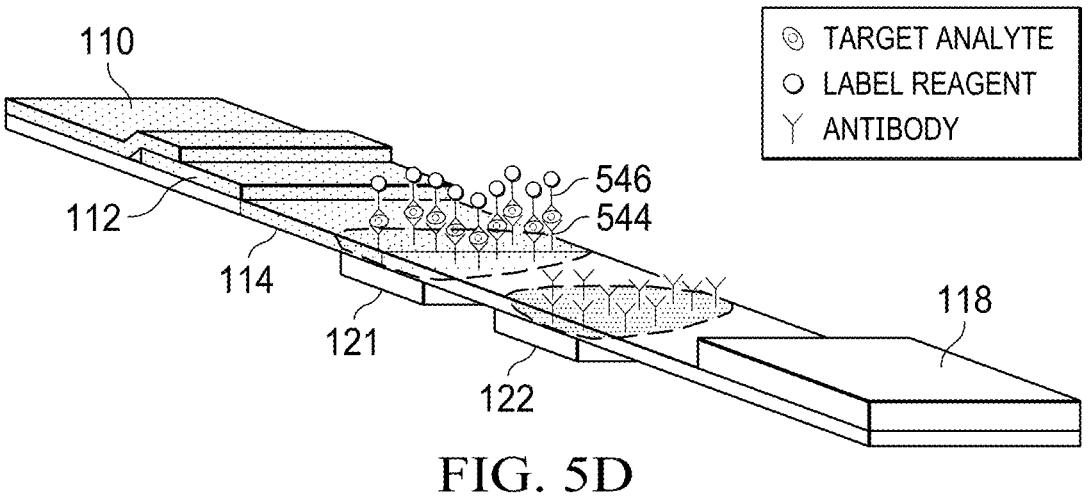

In FIG. 5D, the capillary action continues to move fluid 540 and conjugated labeled antibodies 546 into test region 115 in membrane 114. Test region 115 includes test antibodies 544 which combine with conjugated labeled antibodies 546 to contribute to a change in pH in membrane 114 in test region 115.

The label directly contributes to a reaction, acting as a reactant. The label indirectly contributes to accelerate (catalyze) a reaction, like an enzyme (a biocatalyst) does. However, an enzyme is just an example of a catalyst. More generally, the label presence contributes to the reaction kinetics inside the membrane which ultimately causes a pH change/pH difference in comparison to the reaction which might or might not take place at the control site.

The label can be made part of an electrochemically triggered reaction, such as a redox reaction, which could be triggered by applying a current, a DC potential, or an AC potential to a pair of noble metal electrodes.

Figure 5E:
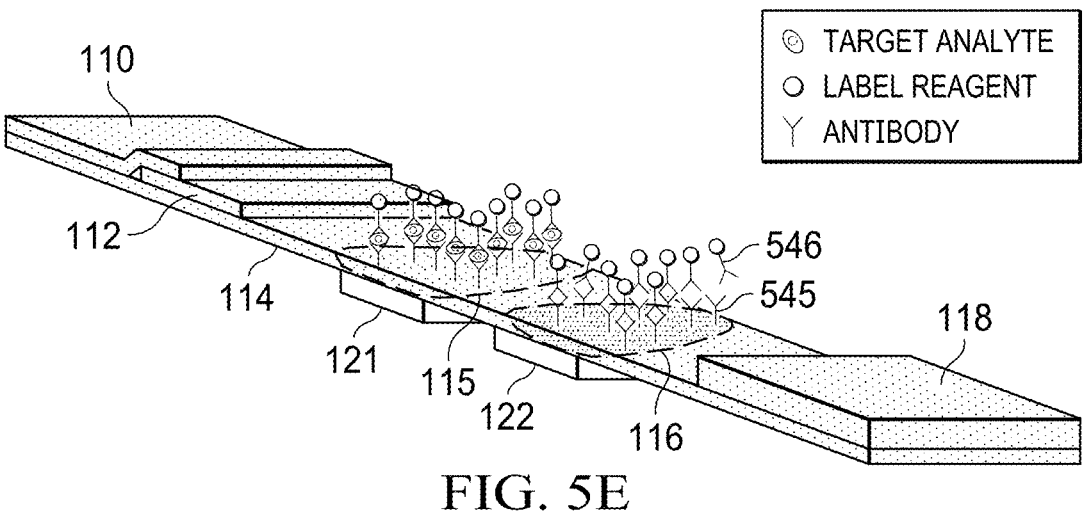

In FIG. 5E the capillary action continues to move fluid 540 and any remaining conjugated labeled antibodies 546 into control region 116 in membrane 114. Control region 116 includes control antibodies 545 which combine with any remaining conjugated labeled antibodies 546 to thereby cause a change in pH in membrane 114 in control region 116.

In a simple example case, urea is converted to ammonia, the main product. In another example case, at the control site there is no reaction or even a pH change in the opposite direction, so that a large signal difference between control and test site is generated.

Active sensor surfaces of sensors 121, 122 are in contact with membrane 114 and sense the respective change in pH in test region 115 and control region 116. The amount of change in pH in each of these two regions allows the concentration of target analyte 541 to be quantified.

FIGS. 6A-6D illustrate example basic components of an example ISFET biosensor 100 (FIG. 1). FIG. 6A is a top view of upper housing 102 that includes sample port 106 that allows a drop of sample liquid to be instilled onto sample pad 110.

FIG. 6B is an isometric view of example ISFET assembly 619 that includes sample pad 110, conjugation pad 112, membrane 114, and absorbent pad 118.

FIG. 6C is a top view of substrate 120. In this example, substrate 120 is a flexible polyimide material on which is mounted sensor die 121, 122, microcontroller die 623. In this example, microcontroller die 623 is low power controller device available in the MSP430 family of mixed signal 16-bit microcontrollers available from Texas Instruments Incorporated. Other examples may use another known or later developed microcontroller to control the operation of sensor die 121, 122. One or more layers of conductive lines on substrate 120 couple sensor die 121, 122 to microcontroller 623. In this example, antenna 624 is a conductive line on substrate 120 and is coupled to a Bluetooth transmitter within microcontroller 623 and provides an interface to allow ISFET biosensor 100 to be interfaced to a smart phone or other type of personal device that allows the quantitative results of a test performed be ISFET biosensor 100 to be presented to a user using an appropriate app on the smartphone or other device.

A battery 625 is included on substrate 120 to provide power for microcontroller 623 and ISFETs 121, 122. In another example, a connector may be provided, such as a USB connector, to obtain power from an external source. In another example, a renewable source of energy, such as a solar cell, may be included.

FIG. 6D is a top view of lower housing 104 that includes recessed regions 641, 642, 643 to provide clearance space for sensor die 121, 122 and microcontroller die 623.

As shown in FIG. 1, substrate 120 is arranged to align sensor die 121, 122 with membrane regions 115, 116 respectively when substrate 120 and ISFET assembly 619 are stacked together and enclosed by upper housing 102 and lower housing 104.

Figure 7:
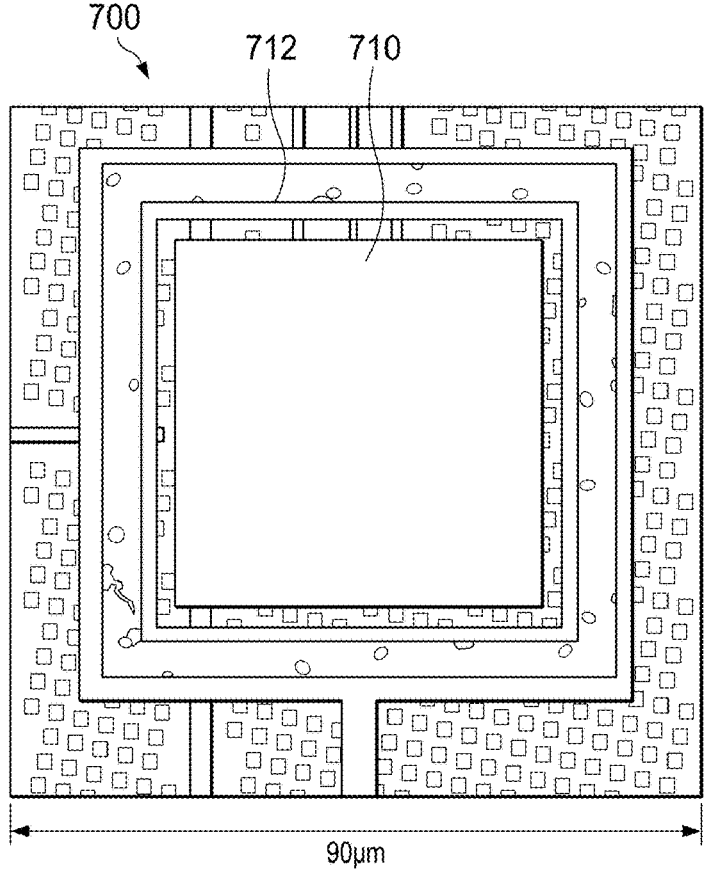
FIG. 7 is a top view of an example ISFET.

FIG. 7 is a top view of an example ISFET 700 that can be incorporated into an ISFET biosensor. An ion-sensitive field-effect transistor (ISFET) is a field-effect transistor used for measuring ion concentrations in solution. ISFETs have been around since 1970 and are described in detail in many places, see, for example: "ISFET," Wikipedia, May 2021 or later.

When an ion concentration changes, the current through the transistor will change accordingly. In this example, a solution moving through membrane 114 (FIG. 5D) is in contact with ion-sensitive gate element 710 which is sensitive to hydrogen ions. ISFET 700 is a special type of MOSFET (metal-oxide-semiconductor field-effect transistor), and shares the same basic structure, but with the metal gate coupled to the ion-sensitive gate element 710, which acts as an active sensing surface for ISFET 700. A source and drain are constructed as for a typical MOSFET. Electron flow takes place in a channel between the drain and source. An ISFET's threshold voltage depends on the pH of the substance in contact with its ion-sensitive barrier. In this example, platinum (Pt) electrode 712 is a reference electrode for ISFET 700. It is multi-purpose and can also be used for ESD protection, or as a working electrode to trigger a close-proximity redox reaction.

The gate potential controls the flow of current between the two electrodes. The surface hydrolysis of Si—OH groups of the gate materials vary in aqueous solutions due to pH value. In this example, ion-sensitive membrane 710 is a combination of Platinum (Pt) and atomic layer deposited (ALD) aluminum oxide (Al2O3). Platinum is useful due to its catalytic capabilities allowing it to split hydrogen peroxide, which is a common reagent in enzyme reactions such as the common ELISA principle. In other examples, other materials may be used for the ion-sensitive membrane, such as: SiO2, Si3N4, Al2O3, Ta2O5, etc.

The mechanism responsible for the oxide surface charge can be described by the site binding model, which describes the equilibrium between the Si—OH surface sites and the H+ ions in the solution. The hydroxyl groups coating an oxide surface such as that of SiO2 can donate or accept a proton and thus behave in an amphoteric way. Expression (1) and (2) illustrate acid-base reactions occurring at the oxide-electrolyte interface.

$$\text{—Si—OH+H}_2\text{O} \leftrightarrow \text{Si—O}^-\text{+H}_3\text{O}^+ \tag{1}$$

$$\text{—Si—OH+H}_3\text{O}^+ \leftrightarrow \text{—Si—OH}_2{}^+\text{+H}_2\text{O} \tag{2}$$

Figure 8:
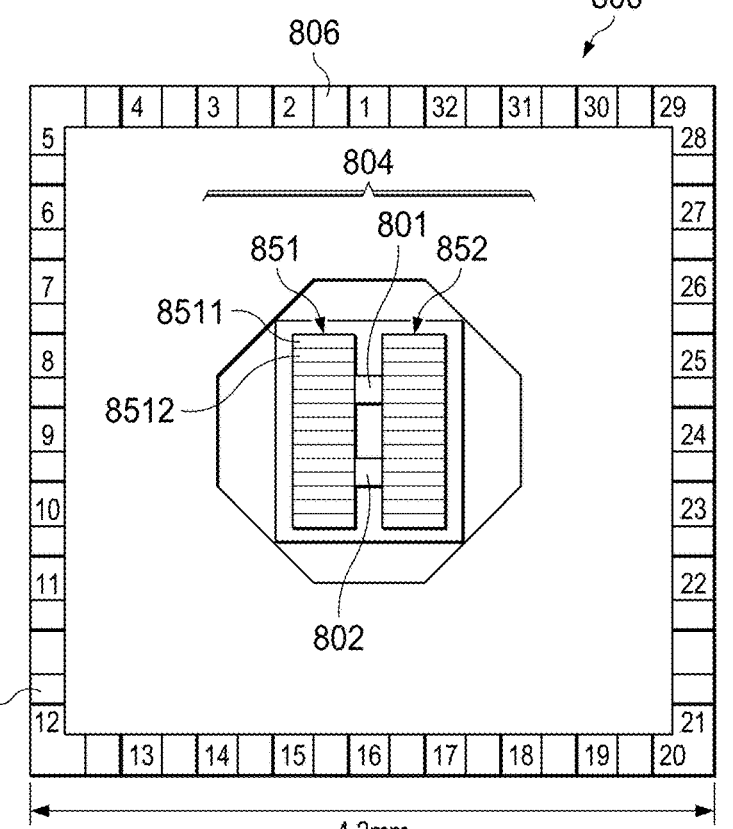
FIG. 8 is a top view of an example ISFET sensor die.

FIG. 8 is a top view of an example ISFET sensor die 800. In this example, there are two ISFETS 801, 802 that each have an ion-sensitive active sensing surface, such as membrane 710 (FIG. 7). In another example ISFET sensor die, there may be many more than two ISFETs. In another example ISFET sensor die, there may be only a single ISFET. In this example, each ISFET is approximately 90 um wide, as illustrated in FIG. 7. In this example, ISFET sensor die 800 is approximately 4.2 mm wide. ISFET sensor die 800 includes a set of bond pads around the periphery of the die, indicated generally at 806. Bond pads 806 are connected to the internal circuitry of sensor die 800.

Sensing electrodes 851, 852 are each coupled to respective low frequency AC (alternating current) transceivers located on sensor die 800. Each transceiver is configured to send a low frequency signal, for example 1-2 kHz, via a portion of electrode, such as transmit section 8511 into a membrane that is near the sensor surface of sensor die 800 and to receive the signal after it passes through a portion of the membrane via another portion of electrode, such as receive section 8512. In this manner, an impedance of the membrane can be determined which is indicative of an amount of fluid that is present in the membrane. I this example, electrodes 851 are divided into four send/receive groups, while electrodes 852 are also divided into four send/receive groups so that a total of eight independent impedance tests can be performed on a membrane in contact with sensing surface 804.

In this example, electrodes 851, 852 are platinum. In another example, other types of conductive materials may be used for electrodes 851, 852. In another example, various electrodes and circuitry may be configured to perform other electro-chemical tests on a fluid in contact with the sensing surface, such as amperometric, impedimetric, potentiometric, etc.

In this example, the top surface of sensor die 800, indicated generally at 804, is referred to as the "sensing surface." Sensing surface 804 includes electrodes 851, 852 and ion sensing membrane 710 (FIG. 7) on ISFETs 801, 802.

ISFET sensor die 800 is fabricated using known or later developed CMOS semiconductor processing techniques on a large wafer with hundreds of dies that is then tested and cut into individual dies. In this example, bare unpackaged sensor die may be mounted on a flexible substrate, such as substrate 120 (FIG. 1) to form an ISFET biosensor device.

Figure 9A:
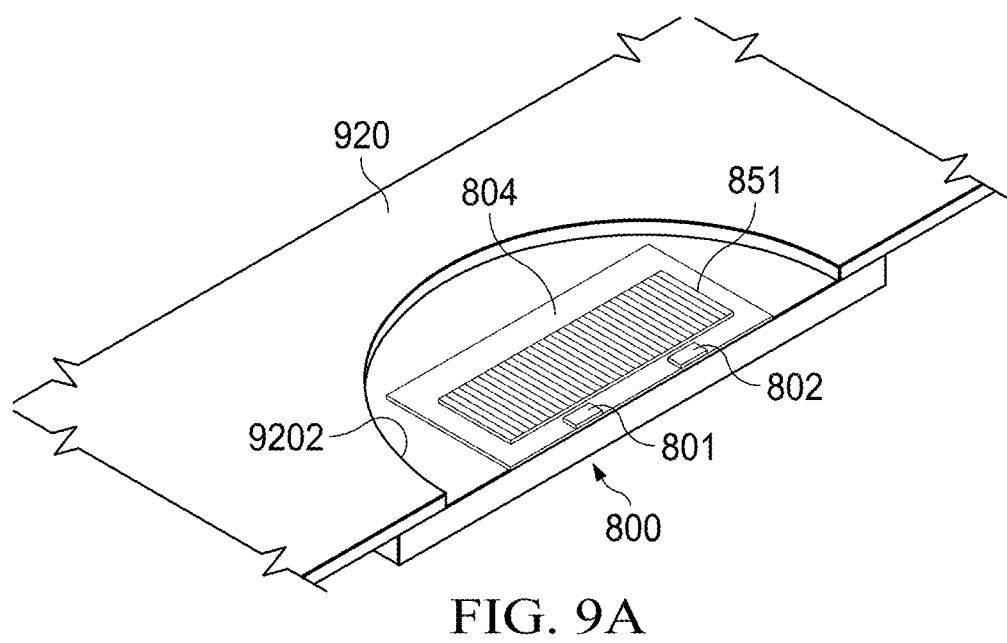
FIG. 9A is an isometric cross-sectional view and FIG. 9B is a cross sectional-view of an example substrate and ISFET sensor die.
Figure 9B:
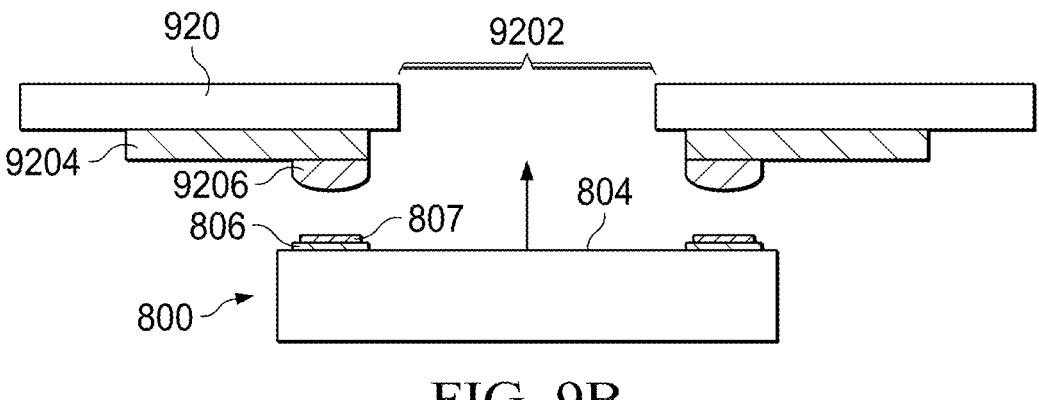

FIG. 9A is an isometric cross-sectional view and FIG. 9B is a cross sectional-view of an example substrate 920 and ISFET sensor die 800 (see FIG. 8). In this example, substrate 920 is similar to flexible substrate 120 of FIG. 1. In this example, substrate 920 is fabricated from polyimide. In other examples, various types of known or later developed substrates suitable for mounting sensor die may be used, such as fiberglass, ceramic, etc. In this example, an opening 9202 is fabricated in substrate 920 to allow a membrane, such as membrane 114 (FIG. 1) to come in contact with sensing surface 804 of sensor die 800.

In this example, substrate 920 includes various conductive signal lines 9204 that are routed to various circuitry locations on substrate 920. Solder bumps 9206 are fabricated on substrate 920 in a pattern to match bond pads 806 on sensor die 800. In this example, a cobalt layer 807 is deposited and patterned on bond pads 806 to eliminate the need for solder bumps on sensor die 800. Sensor die 800 is then connected to substrate 920 using solder bumps 9206 provided on substrate 920. In other examples, known or later develop flip-chip or wire bonding techniques for mounting a chip to a substrate may be used.

Figures 10A, 10B, 10C:
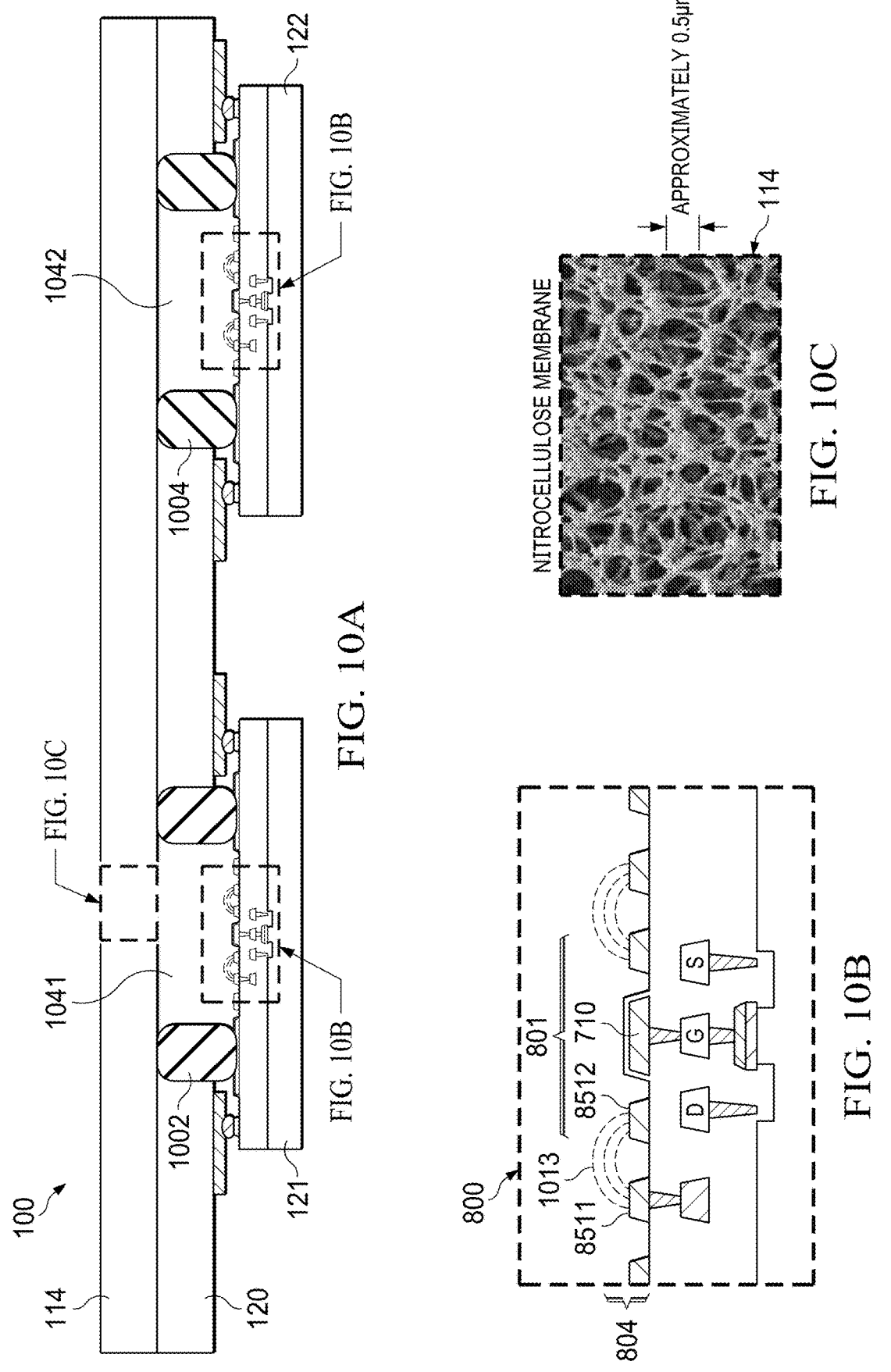
FIGS. 10A-10C, 11 are cross-sectional views showing a portion of an example ISFET biosensor in more detail.

FIGS. 10A-10C are cross-sectional views showing a portion of an example ISFET biosensor 100 (FIG. 1) in more detail. In this example, flexible substrate printed circuit board (PCB) 120 is fabricated from FR-4 fiberglass reinforced epoxy laminate, a common substrate material used in electronic devices. Circular openings 1041, 1042 are provided so that the sensor surface of sensor dies 121, 122 are facing towards porous membrane 114. In the example, porous membrane 114 nitrocellulose paper material in which the interconnect pores are approximately 0.5 um, as illustrated in FIG. 10C. A target antibody-virus enzyme complex for this example ISFET biosensor has a molecule size of less than approximately 0.1 um, so the target molecules can easily move through porous membrane 114 when carried in a carrier liquid by capillary action.

FIG. 10B is a cross-sectional view of an example ISFET sensor 800 (FIG. 8). In this example, transmit section 8511 and receive section 8512 of electrode 851 is illustrated in more detail. Radiated field 1013 illustrates an electric field that can be established between transmit section 8511 and receive section 8512 under control of transceiver module (in MCU 623, FIG. 6C) that is mounted on substrate 120. Electric field 1013 is used to perform potentiometric measurement to determine impedance produced by fluid in membrane 114, ISFET sensors 121, 122 are the same as ISFET sensor 800.

As described above in more detail, during operation of ISFET biosensor 100 a fluid is moves through porous membrane 114 via capillary action. To prevent the fluid from leaking out through openings 1041, 1042, rubber O-rings 1002, 1004 are installed. In another example, another sealing techniques may be used, such as: biocompatible epoxy material, silicon, etc. In another example, no sealing is required. For example, in an inexpensive throwaway device in which a test is performed in a short time, such as 5-60 minutes and then the device is thrown away, corrosion caused by leaking of the sample material is not an issue.

Figure 11:
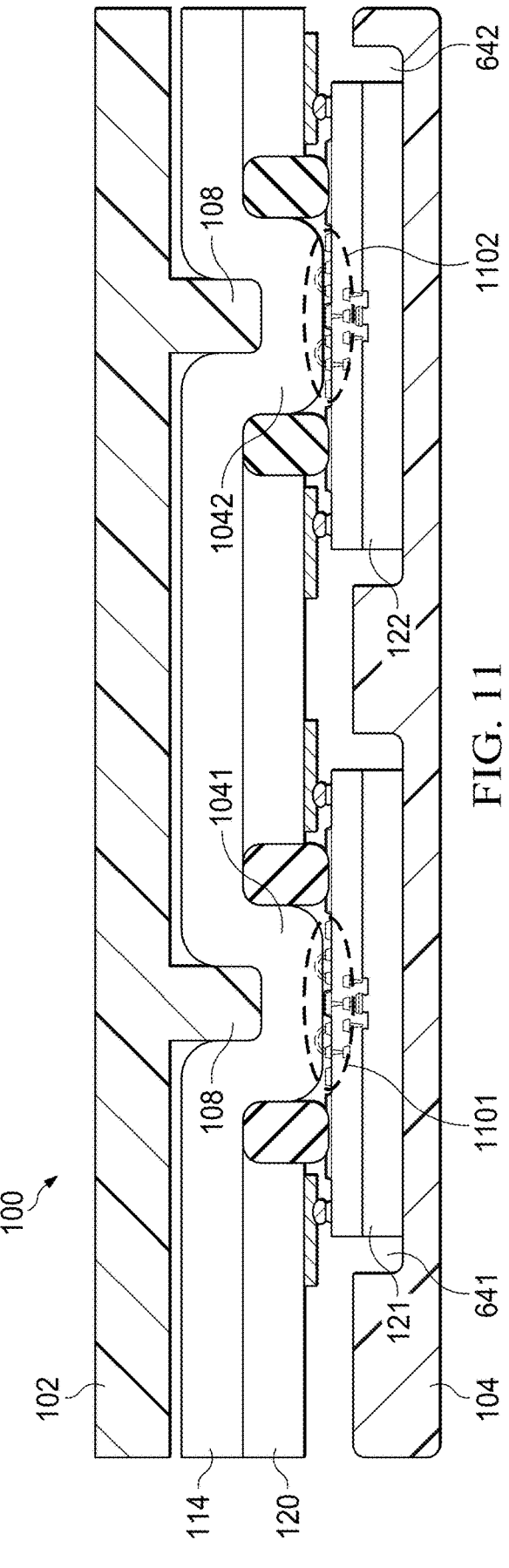

FIG. 11 is a cross-sectional view showing a portion of example ISFET biosensor 100 (FIG. 1) in more detail. In this example, upper housing 102 and lower housing 104 are in position and coupled together. In this example, upper housing 102 includes posts 108 that force porous membrane 114 to deform into openings 1041, 1042 so that porous membrane 114 is in contact with the active sensor surfaces 1101, 1102 of ISFETs 121, 122, respectively.

In this manner, a chemical reaction that occurs in porous membrane 114 can be detected by an active sensor surface of an ISFET. Different types of reactions can be detected by placing appropriate reagents in porous membrane 114 without needing any change to the ISFET sensor.

In this example, two separate ISFET sensor die 121, 122 are used. In another example, a larger ISFET sensor die can be fabricated that contains both the test sensor 121 and the control sensor 122 on a single die.

Figure 12:
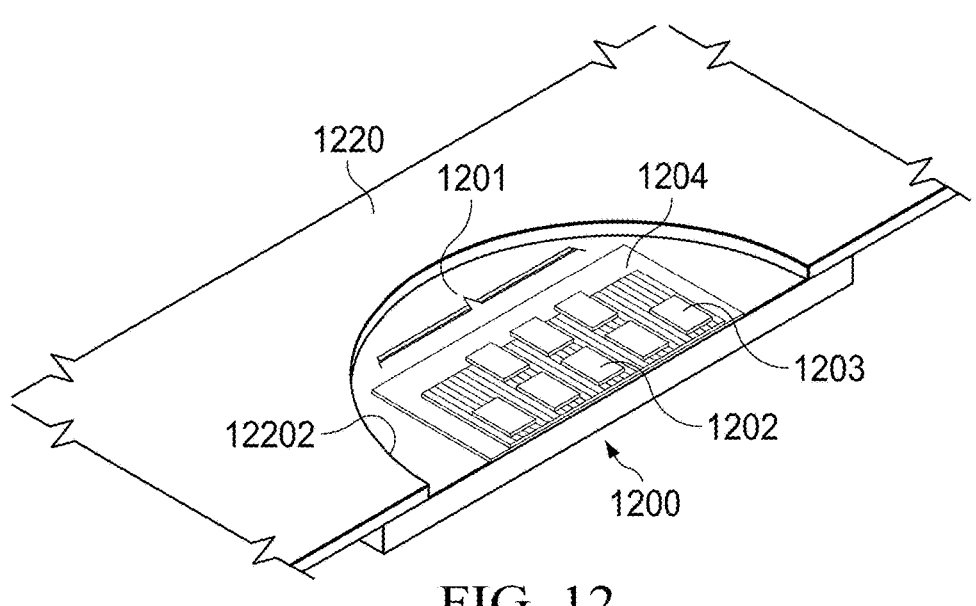
FIG. 12 is an isometric cross-sectional view of a portion of another example ISFET biosensor.

FIG. 12 is an isometric cross-sectional view of a portion of another example ISFET biosensor that is similar to ISFET biosensor 100 (FIG. 1). In this example, an array of ISFETs 1201 is fabricated on a single sensor die 1200. ISFET sensor die 1200 is mounted on flexible substrate 1220 in which a single opening 12202 is fabricated in substrate 1220 to allow a membrane, such as membrane 114 (FIG. 1) to come in contact with sensing surface 1204 of sensor die 1200.

Figure 13:
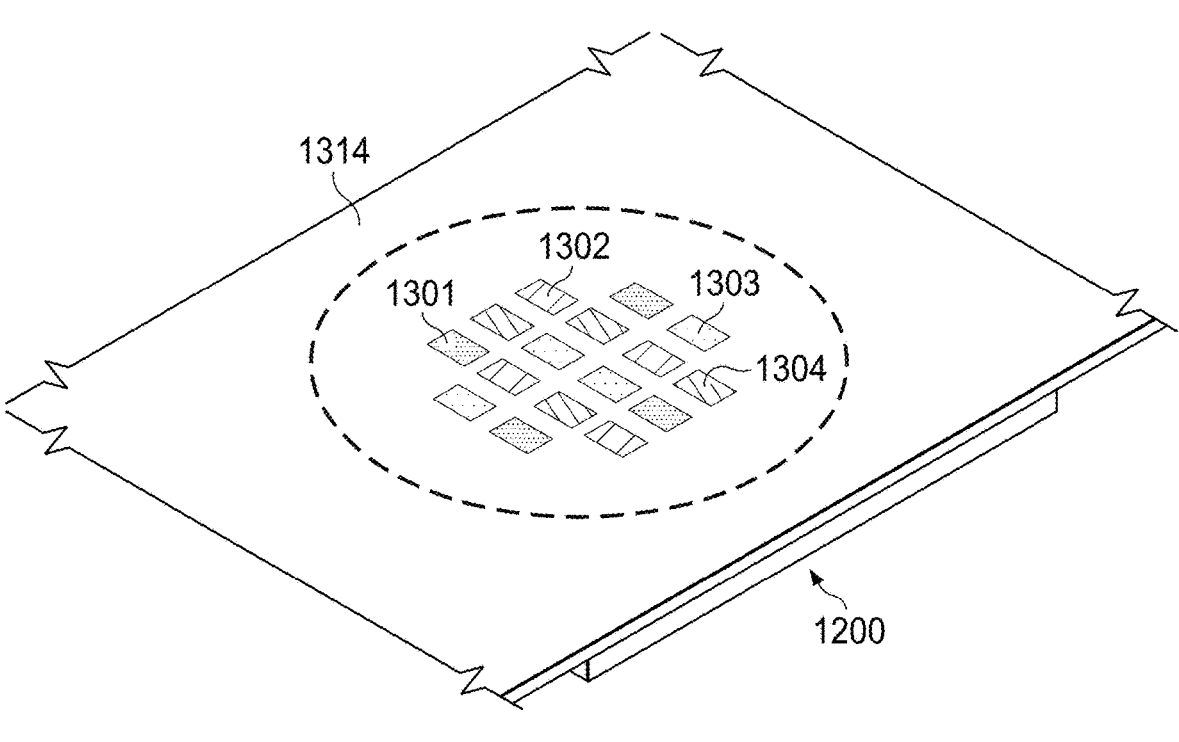
FIG. 13 is an isometric view of a portion of another example porous membrane.

FIG. 13 is an isometric view of a portion of an example porous membrane 1314 for use with the array of ISFETs 1201 illustrated in FIG. 12. In this example, two or more different types of target analyte are placed in locations that align with ISFET array 1201. For example, a first type of target analyte is placed in spot 1301, a second type of target analyte is placed in spot 1302, a third type of target analyte is placed in spot 1303, and a fourth type of target analyte is placed in spot 1304. Each target analyte spot is located to align with an ISFET location in array 1201.

In an example prototype device, a nitrocellulose membrane with 0.45 μm pore size was spotted with capture reagents using a Biodot spotter.

In this example, each ISFET in array 1201 senses a change in pH caused be each separate reaction caused by various target analytes 1301, 1302, 1303, 1304 in response to a sample that is dropped into a sample port of an ISFET biosensor, such as sample port 106 (FIG. 1).

FIG. 14 is a flow diagram illustrating operation of an example ISFET biosensor, such as example ISFET biosensor 100 (FIG. 1).

At 1402, a sample of target molecules is obtained and diluted with a liquid. A drop of the diluted target molecules is then deposited in a sample port of an ISFET based LFA biosensor.

At 1404, the drop of diluted target molecules propagates through a porous membrane by capillary action to a conjugation pad.

At 1406, the diluted sample of target modules is exposed to a reagent on the conjugation pad to form conjugated molecules that move with the liquid through the porous membrane.

At 1408, the liquid with the conjugated molecules moves to a test region in the porous membrane and are exposed to a test analyte in the test region. A reaction between the conjugated molecules and the test analyte produces a change in pH in the liquid in the test region.

At 1410, the liquid with any remaining conjugated molecules moves to a control region in the porous membrane and are exposed to a control analyte in the control region. A reaction between the remaining conjugated molecules and the control analyte produces a change in pH in the liquid in the control region.

At 1412, an assay result is determined by measuring the pH in the test region and control region by ISFET sensors that have active sensor regions in contact with the porous membrane and thereby to the liquid in the test region and the control region. For example, a value of the pH in the test region can indicate the concentration of the target molecules in the sample. A value of the pH in the control region can indicate if sufficient liquid has reached the test region to be a valid test. pH is a log scale quantity; analyte concentration typically varies in a log-scale manner depending on infection stage and patient-to-patient and virus-to-virus.

At 1414, the quantitative results of the assay are displayed to a user. In one example, the ISFET biosensor contains a display on which the results are presented. In another example, the ISFET biosensor may contain a wireless transceiver that is configured to provide the results to personal device, such a smart phone. An application (app) on the personal device can then present the quantitative results to the user. Alternatively, the app on the personal device maybe configured send the quantitative results to a doctor's office, lab, hospital, etc.

Figure 15:
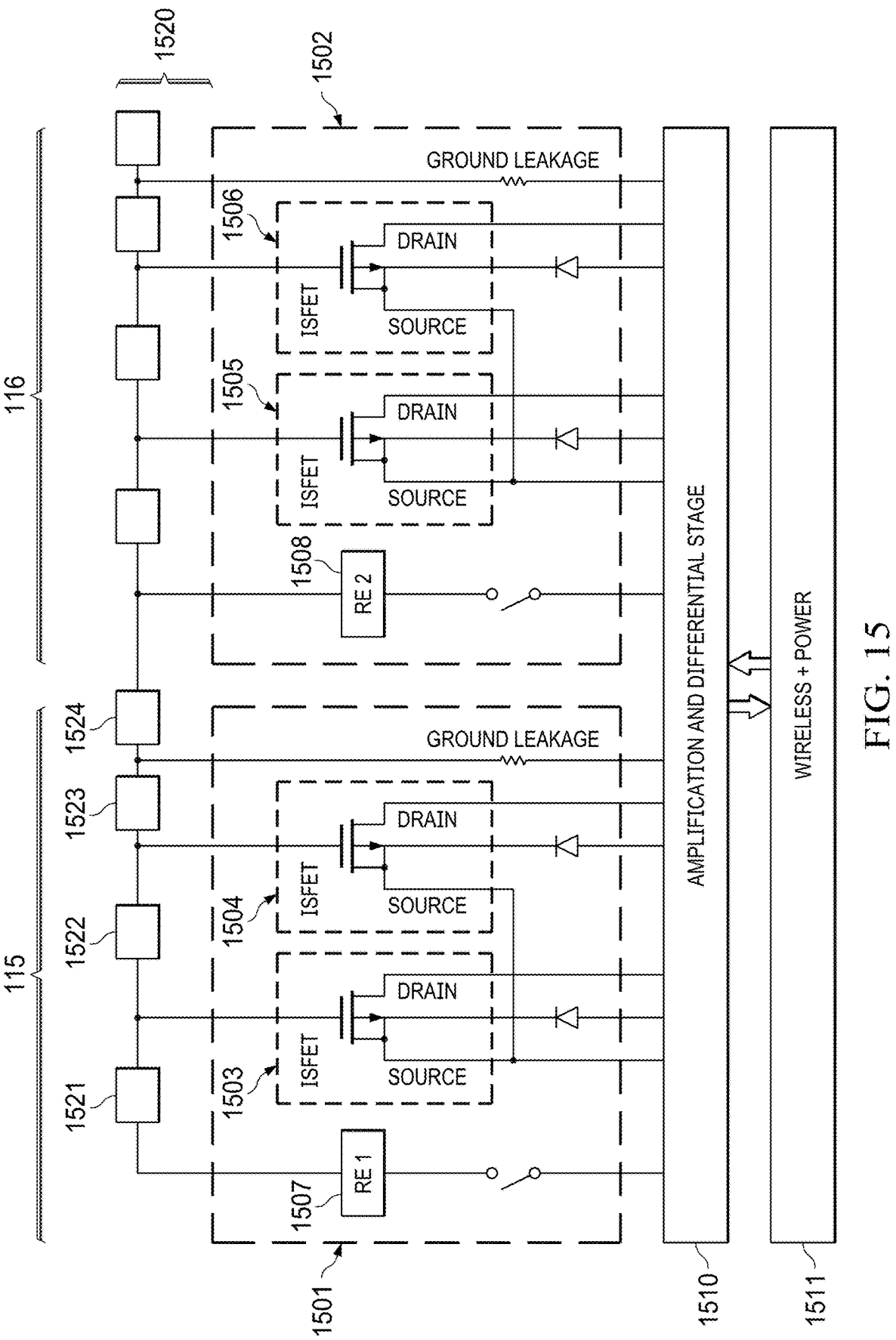
FIG. 15 is schematic diagram of an example ISFET biosensor.

FIG. 15 is schematic diagram of an example ISFET biosensor. In this example, sensor die 1501 includes two ISFET transistors 1503, 1504 and sensor die 1502 includes two ISFET transistor 1505, 1506. ISFET transistors 1503-1506 are coupled to amplification and differential stage 1510 which is coupled to a controller 1511 that includes a wireless transceiver. In this example, a battery provides power. In this example, sensor die 1501, 1502, amplification and differential stage 1510, controller 1511 and the battery are mounted on a flexible substrate, such as flexible substrate 120 (FIG. 1).

A membrane 1520 is represented by various DC resistance elements 1521, 1522, 1523, 1524, etc. that act as "salt bridge resistors" due to the presence of the sample solution percolating through membrane 1520. Membrane 1520 is similar to membrane 114 (FIG. 1).

ISFET sensor die 1501 is aligned with a test region 115 and ISFET sensor die 1502 is aligned with a control region 116.

In this example, reference electrodes 1507, 1508 are equivalent to electrode 712 (FIG. 7). An ISFET ideally is only sensitive to pH. Every element in an electrochemical cell is also sensitive to pH and has non-linear/reproducible effects or changes to it. In that way, the potential of two noble metal electrodes is not always the same, they can experience drift in signal for no obvious reasons, even signal jumps. Especially in a changing electrolyte this will be even more pronounced. A true reference electrode always requires a certain electrode which is in equilibrium with a reference electrolyte, which is in contact with the electrolyte under test. Such a reference element is called a "reference electrode", since the potential difference between the electrode and the electrolyte under test is ideally zero, unchanging with pH or drifting. In that sense, to operate an ISFET (i.e. to keep the MOSFET part of the ISFET operational) a bias to the electrolyte is required, for which an electrode is required. True unchanging bias can only be achieved by a RE. If any other electrode (noble or non-noble metal) is used it will exhibit behavior such as described above, and the ISFET signal will be indistinguishable from the electrode behavior. But, instead of an RE, two ISFETs biased by a non-reference electrode (called "pseudo reference") will both exhibit the same irreproducible bias. If both however see a different change in pH, their differential signal will be different. That means their signals need to be to subtracted or compared using a differential technique. In this example, an ISFET at the control region 116 is a reference that can eliminate pseudo-RE behavior.

In described examples, a chemical reaction that occurs in a porous membrane can be detected by an active sensor surface of an ISFET that is in contact with the porous matrix. Different types of reactions can be detected by placing appropriate reagents in the porous membrane without needing any change to the ISFET sensor. The biosensor surface does not need to be modified for different test configurations. A porous membrane that will carry a liquid solution to be tested is mechanically pressed against the active sensor surface. In this manner, the ISFETs are "generic" and not functionalized to perform a particular ion sense function. This allows a variety of biosensors to be manufactured in large or small quantities using identical components by simply placing different reagents in the conjugation pad and the test/control regions of a porous membrane that is in contact with an active sensor surface of the sensor die that contains the ISFETs.

ISFETs are compatible with known complementary metal oxide semiconductor (CMOS) fabrication techniques and can be easily fabricated on a CMOS die and coupled to various other CMOS transistors and modules, such a micro-controller 623 (FIG. 6C).

With a Pt pseudo reference element, such as 712 (FIG. 7), a true reference element (RE) (such as Ag/AgCl on-chip or in each LFA as a discrete element/electrode) is not needed due to differential readout principle with a Pt pseudo-reference. In this example, an ISFET in the test region vs. an ISFET in the control region, vs., possibly, reference-region ISFET underneath a non-functionalized membrane Proper wetting can be measured by "simple" impedance spectroscopy using only a few low frequencies of interest and not high resolution.

In described examples, by using smartphone app and wireless information transfer from an ISFET biosensor, a user can get an informed result and suggested further action, such as in case of an ongoing virus pandemic, whether to self-isolate, visit a clinic or hospital, repeat the test, or send the LFA as a safe sample container to a lab for further analysis.

In another example, integrated components such as a blood oxygen sensor and a temperature sensor can take further medical readings such as blood oxy and temperature to get further information and hence statistical certainty whether an infection is ongoing.

In another example, an oxidation-reduction (redox) reaction chemical reaction in which the oxidation number of a molecule, atom, or ion changes by gaining or losing an electron in response to imposing an AC or a DC potential on the sample fluid in the membrane supplied by a noble metal electrode on an ISFET sensor die, such as electrode 712 (FIG. 7). The formation of hydrogen fluoride is an example of a redox reaction.

In described examples, wireless and readout electronics may include an MCU, such as MSP430, and a battery to allow data transfer to a smartphone app or another reader unit that could be used multiple times, and for multiple illnesses/analytes to be detected.

In experiments with a described example, analytical label sensitivity was demonstrated with a LOD of 3 million target molecules.

In various examples, multiple sensors can be provided in one sensor die, such as: wetting sensor; conductivity, pH, O2, impedance spectroscopy, cyclovoltammetry, temperature (PT100), optical, electrochemical. In this manner, an "all-in-one" lab on a chip can be provided.

Described examples are easy to use either in a physician's office setting or self-administered by a patient or other untrained personnel in the field. Test results are fast, typically less than fifteen minutes to get results.

There are many potential uses for the described examples, including:

High Sensitivity Virus Sensor

Immunity passport for work/social events/travel (public transport, flights, . . . )

Applicable to any virus, e.g., tropical, Ebola

Water/Food Home Analysis

Detection of Legionella, Chlamydia, hormones . . .

Detect water contamination (cholera, typhus, etc.)

Low quantity medical biomarker pre-screening

Drug screening

Cancer markers

Alzheimer, HIV, MS, ALS, . . .

Precision farming

Live stock: precise & fast virus/bacteria detection

Fertilizer and Pesticide measurement: avoid overfertilization & ground water contamination, cost savings

OTHER EMBODIMENTS

In described examples, two separate ISFET sensor die are used, one located in a test region and one located in a control region. In another example, a larger ISFET sensor die can be fabricated that span both the test region and control region that contains both the test sensor and the control sensor on a single die.

In described examples, two ISFETs are provided on a single sensor die for the test region and two ISFETs are provided on a separate sensor die for the control region. In another example, a single ISFET may suffice for each region, or more than two ISFETS may be provided for each region to improve accuracy and reliability.

In another example, an ISFET sensor die contains a matrix of ISFETs. Spots of various reagents are deposited in a porous membrane in such a way each spot of reagent aligns with one of the ISFETs in the array of ISFETs.

In another example, a low cost ISFET biosensor may be configured that has just a test region without a control region.

In described examples, a sample pad, conjugation pad, test membrane, and absorbent pad are each described and may be manufactured as separate pieces that are joined together to form a porous membrane. As used herein, the term "porous membrane" refers to the combination of various sections, whether manufactured as separate pieces or manufactured as a single continuous unit.

In described examples, a porous membrane containing reagents is placed in contact with an active sensor surface of a sensor die. The term "in contact" means the porous membrane is close enough to the active sensor surface so that when a sample liquid is present in the porous membrane ions in the fluid can be transferred to the active sensing surface.

In described examples, a wireless transceiver and loop antenna is described. In another example, a digital readout may be included directly in the biosensor. In another example, a connector may be included, such as a USB type connector. to allow the biosensor to be plugged into another device, such as a laptop computer to transfer quantitative data from the biosensor using a hard-wired connection. The USB connection may also be configured to provide power to operate a microcontroller and ISFETs of the biosensor.

In this description, the term "couple" and derivatives thereof mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Modifications are possible in the described embodiments, and other embodiments are possible, within the scope of the claims.

What is claimed is:

1. An apparatus comprising:
a substrate having opposite first and second surfaces, and a first opening and a second opening through the substrate;
a porous membrane on the first surface, the porous membrane having a first membrane region that contains a test analyte and a second membrane region that contains a reference analyte, at least a part of the first membrane region being over the first opening, and at least a part of the second membrane region being over the second opening;
a first seal structure in the first opening;
a second seal structure in the second opening;
a first sensor mounted on the second surface and on the first seal structure, the first sensor having a first ion sensing field effect transistor (ISFET) having a first ion sensitive gate element located in a first active sensor surface of the first sensor, wherein the first active sensor surface is exposed in the first opening and is surrounded by the first seal structure;
a second sensor mounted on the second surface and on the second seal structure, the second sensor having a second ISFET having a second ion sensitive gate element located in a second active sensor surface of the second sensor, wherein the second active sensor surface is exposed in the second opening and is surrounded by the second seal structure;
a controller mounted on the substrate and coupled to the first ISFET and to the second ISFET; and
an interface module mounted on the substrate and coupled to the controller.

2. The apparatus of claim 1, wherein the interface module is a wireless transmitter.

3. The apparatus of claim 1, wherein the interface module is coupled to a human readable display.

4. The apparatus of claim 1, further comprising a housing on the porous membrane, the housing having an opening configured to direct a liquid drop to a third membrane region of the porous membrane.

5. The apparatus of claim 4, wherein the third membrane region is located a distance away from the first and second membrane regions.

6. The apparatus of claim 5, wherein the porous membrane further includes a conjugation region that contains a conjugate reagent, wherein the conjugate region is located between the third membrane region and the first and second membrane regions.

7. The apparatus of claim 4, wherein the third membrane region includes both the first and second membrane regions.

8. The apparatus of claim 4, wherein the housing includes standoffs that press the first membrane region through the first opening onto the first active sensor surface of the first sensor-die and press the second membrane region through the second opening onto the second active sensor surface of the second sensor.

9. The apparatus of claim 1, wherein the first sensor includes an impedance spectroscopy module coupled to impedance sensor electrodes located on the first active sensor surface.

10. The apparatus of claim 1, wherein each of the first and second seal structures includes a respective rubber ring.

11. An apparatus comprising:
a substrate having opposite first and second surfaces and an opening through the substrate;
a seal structure in the opening;
a sensor die mounted on the first surface and on the seal structure, the sensor die having at least one ion sensing field effect transistor (ISFET) having an ion sensitive gate element located in an active sensor surface of the sensor die, wherein the active sensor surface is exposed in the opening and is surrounded by the seal structure;
a porous membrane having a membrane region that contains an analyte, in which the membrane region extends through the opening and contacts the active sensor surface;
a controller mounted on the substrate and coupled to the ISFET; and
an interface module mounted on the substrate and coupled to the controller.

12. The apparatus of claim 11, wherein the sensor die includes an array of ISFETs, and wherein the porous membrane includes an array of analyte spots, wherein each of the analyte spots is aligned with a respective ISFET in the array of ISFETs.

13. The apparatus device of claim 11, further comprising a housing on the porous membrane, the housing including at least a standoff that presses the membrane region through the opening onto the active sensor surface.

14. The apparatus of claim 11, wherein the seal structure includes a rubber ring.

\* \* \* \* \*